May 2, 1933.  C. P. HARRIS  1,907,103
METHOD AND APPARATUS FOR ANALYSIS
Filed Sept. 18, 1929
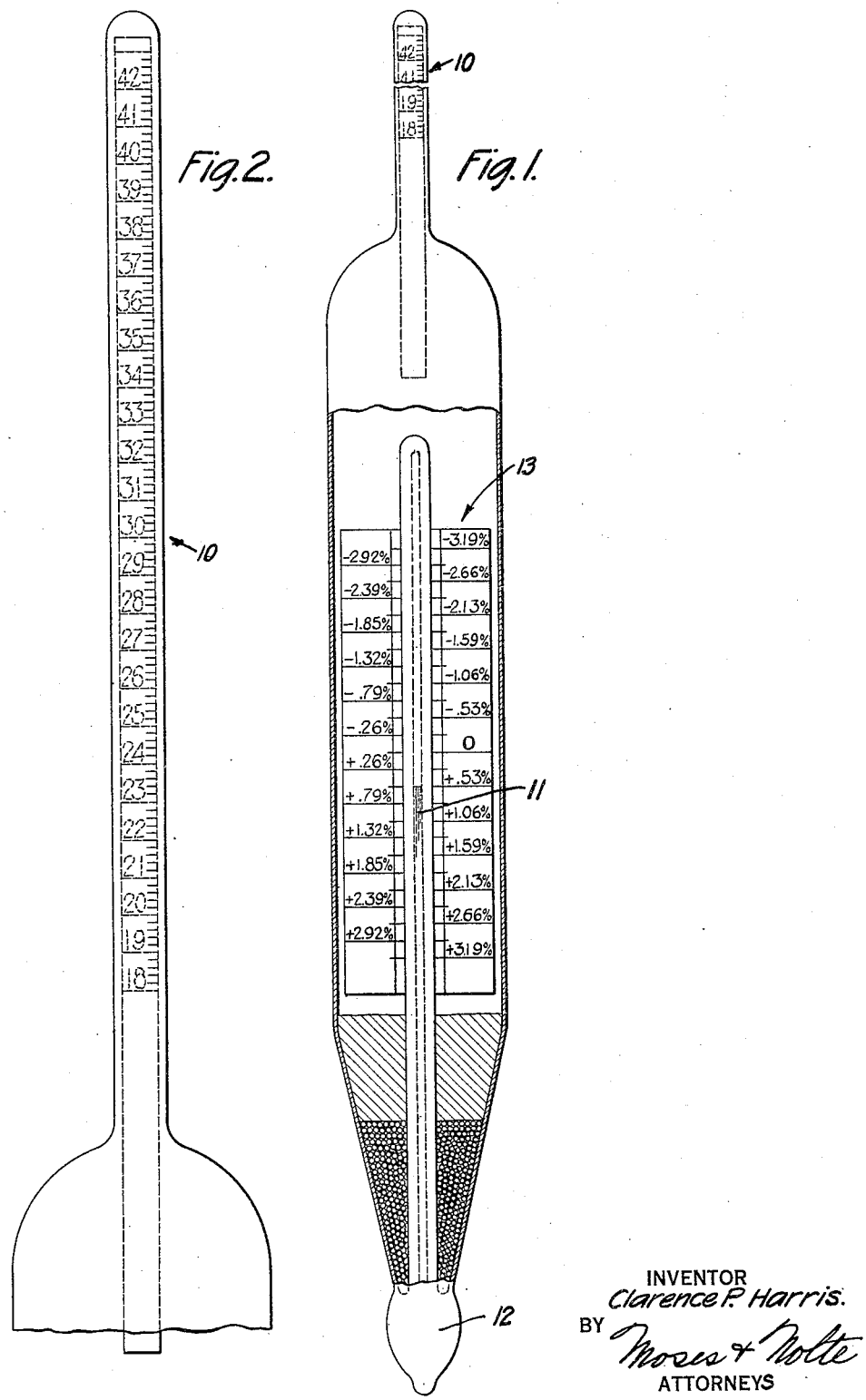
INVENTOR
*Clarence P. Harris.*
BY *Moses & Nolte*
ATTORNEYS Patented May 2, 1933

1,907,103

UNITED STATES PATENT OFFICE

CLARENCE P. HARRIS, OF NEW YORK, N. Y., ASSIGNOR TO SCHWARZ LABORATORIES, INC., OF NEW YORK, N. Y., A CORPORATION OF NEW YORK

METHOD AND APPARATUS FOR ANALYSIS

Application filed September 18, 1929. Serial No. 393,337.

My present invention relates to a method and apparatus for determining the percentage of fat in a substance containing same, and more particularly to the rapid determination of cocoa butter in materials containing same, such as cocoa and chocolate products. The invention is applicable to the determination of animal and vegetable fat contents, whether in the solid or liquid states. While not limited thereto, the invention also involves a special solvent for dissolving the fat substance. The invention will be best understood by the following detailed description taken with the annexed drawing in which Figure 1 is a view in elevation, with a part broken away, of an illustrative embodiment of a hydrometer forming part of my invention; Figure 2 is a view on a somewhat larger scale of the hydrometer stem.

In carrying out my improved method I weigh a convenient portion of the material to be analyzed, as for example 100 grams, preferably in an aluminum beaker and then add approximately a 100 cubic centimeters portion of solvent which latter is to be more fully described hereinafter. It is important, however, for the rapid performance of the analysis that the amount weighed bear a definite relation to the amount of solvent subsequently to be added so that the weight of the material having been decided upon, preferably a single balance weight equal to this weight (weight #1), is made up and used for all determinations of the given substance. The substance having been weighed out and the first portion of solvent added, the mixture is stirred until the product is thoroughly wet and then heated on a Bunsen burner or electric stove until the contents of the beaker begin to fume strongly or until the material, as for example, chocolate, has melted. The heating of the solvent and material is not always necessary and in certain cases may be dispensed with.

The beaker is then removed from the burner and cooled in cold water to approximately room temperature. The outside of the beaker is now carefully dried and again placed upon the balance pan and counterbalanced by a larger weight designated #2 which bears a definite relation, to be discussed later, to weight #1. Enough solvent is now added to balance this weight. The beaker is removed and a suitable filtering medium, as for example coarse asbestos, is added and vigorously stirred with the mixture. A funnel, preferably of the Buchner type, provided with a receiving flask of special shape to be mentioned below, is now prepared with a filter paper and wet with a definite amount, e. g. 3 c. c. of solvent, the vacuum being applied so that the paper sucks down tightly to the porcelain. The contents of the beaker are now filtered using a partial vacuum with a result that the filtration should not take more than 8 to 10 minutes. Preferably in lieu of the usual filter jar, a jar of special construction i. e. of cylindrical shape and of a height several times its diameter, permitting the use of a hydrometer, is employed. The filtration being completed, the temperature of the filtrate is adjusted preferably to around 20 degrees C. as by placing the container in a battery jar filled with cold water, the filtrate agitated with a stirrer and the specific gravity thereof ascertained preferably by means of a special hydrometer described below.

It is a feature of my invention that by suitably proportioning the weight of solvent to the weight of material taken, it is possible to calibrate the hydrometer so as to give a direct reading of the fat content. To accomplish this it is first necessary that relationship be determined empirically between the change in specific gravity of the solvent with increase of fat content. Accordingly, prior to analyzing the sample as mentioned, a graph showing the variation in gravity by the addition of increments cocoa butter, for example, is made whereby given the gravity of the mixture, the percentage of cocoa butter therein may be read from the graph. The hydrometer may then be calibrated directly in percent of cocoa butter or other substance. By suitably relating the weight of the substance taken to the weight of solvent used in the final mixture, the scale of the calibration may be suitably adjusted. Thus, if the weight of the sample taken is 100 grams and the amount of fat contained therein is determined in grams it is obvious that this figure is also the percentage of fat. The total amount of solvent added is such that the specific gravity of the resulting solution of fat bears a definite and constant relation to the amount of fat added to the sample. For example, if 100 grams of sample are taken 587.6 grams of this particular solvent to be hereinafter described will give the solution of fat whose gravity bears the relation described.

In the working out of the graph referred to, the factor difference in temperature above and below 20° should be recorded and the changes in gravity due to difference in temperature applied to the hydrometers so that temperature corrections may be added or subtracted from the percent of cocoa butter indicated.

In the drawing I have shown a hydrometer having a scale 10 which is calibrated in percent of cocoa fat in the sample when a definite weight thereof is taken with reference to the amount of solvent employed in the final mixture. Associated with the hydrometer is a thermometer stem 11 leading from a thermometer bulb 12, such thermometer being provided with a scale 13 in which the correction in percent is marked thereon directly. By this arrangement the correction necessitated by the temperature of the solvent varying from the 20° C. standard is greatly facilitated, the numerical value of the correction being read directly from the scale 13 and added to the reading of scale 20, due record being had for the sign of such correction.

Describing now the preferred solvent used, it will be observed that in order for the change in specific gravity due to the addition of the fat to be of considerable magnitude and hence to afford substantial accuracy to the method, the difference in gravity between the solvent and the substance dissolved should be substantial. This consideration plus that of ability to dissolve the fat substances as well as availability, has led to the selection of a solvent having ortho dichlor benzene as its basic ingredient. Ortho dichlor benzene cannot be ignited by a free flame, and furthermore, as its boiling point is high, that is 179° C., the fat solution when finally obtained will not change noticeably however many hours it may stand exposed to the air by reason of the low volatility of the solvent.

In using ortho dichlor benzene it is important to observe that the commercial substance is apt to contain a varying amount of the para isomer. Since the specific gravity of this is slightly different from the ortho, it is advisable to determine the amount of the para isomer present and then standardize the material preferably by adding one or other of the pure isomers so as to yield a final solution containing preferably 85% of the ortho isomer. It should be noted that the use of a mixture of ortho and para dichlor benzenes of definite and exact content of these two isomers either for fat extraction or analysis is new. A definite composition is an absolute necessity for this method. If the commercial product is used in this process, incorrect results will be obtained. By adopting this composition for the solvent, the commercial variety need be adjusted a minimum amount. In carrying out the above method it will be noted that the exact amount of solvent added the first time is immaterial since any variation is taken care of by the subsequent addition to render the combined weight of solvent and material digested constant.

Various changes in the method will occur to those skilled in the art, which changes, however, will not depart from the spirit of my invention nor the scope of the appended claims.

I claim:

1. The method of determining fat in a substance containing same which consists in dissolving the fat content in dichlor benzene of known specific gravity, separating the solution from the non-fatty portion and determining the percentage of fat in said solvent by determining the specific gravity thereof.

2. The method of determining fat in a substance containing same which consists in dissolving the fat content in a mixture of ortho and para dichlor benzenes in known proportions, separating the solution from the non-fatty portion and determining the percentage of fat in said solvent by determining the specific gravity thereof.

3. The method of determining fat in a substance containing same which consists in dissolving the fat content of a sample in a solvent, separating the solution formed from the non-fatty portion and placing in said solution an instrument of the hydrometer type that measures the specific gravity in terms of the percentage of fat in the sample, the weight of the sample and of the solvent used being such that the value so read is a direct measure of the percentage of fat in the sample.

4. The method in accordance with claim 3 in which the solvent used has a specific gravity greater than one.

5. The method of determining fat in accordance with claim 3 in which the solvent is composed substantially of dichlorbenzene.

6. The method according to claim 3 in which the solvent is a mixture of ortho and para dichlorbenzenes in known proportion.

7. The method of determining fat in a substance containing same which consists in dissolving the fat content of a sample in a solvent, separating the solution formed from the non-fatty portion and placing in said solution an instrument of the hydrometer type that measures the specific gravity in terms of the percentage of fat in the sample, simultaneously measuring the temperature of the solution, applying a factor of temperature correction to the value given by said instrument, the weight of the sample and of the solvent used being such that the corrected value so read is the percentage of fat in the sample.

8. As a new analytical reagent for fat determinations, a standardized fat solvent solution composed substantially of 85% ortho dichlor benzene and 15% para dichlor benzene.

9. In a method of determining fat in a substance containing same, the step of dissolving the fat and obtaining a solution of same in a solvent consisting substantially of a standardized mixture of ortho dichlor benzene and para dichlor benzene.

10. An instrument of the hydrometer type for determining the fat content of a fat-bearing material, said instrument comprising an upright floating stem and a body portion, said instrument having a scale that is calibrated so as to measure the specific gravity of a specific solution containing the fat content of a sample of known weight in terms of the percentage of fat in the sample.

11. An instrument of the hydrometer type for determining the fat content of a fat-bearing material, said instrument comprising an upright floating stem and a body portion, said instrument having a scale that is calibrated so as to measure the specific gravity of a standardized mixture of ortho and para dichlorbenzenes containing the fat content of a sample of known weight in terms of the percentage of fat in the sample.

12. An instrument of the hydrometer type for determining the fat content of a fat-bearing material, said instrument comprising an upright floating stem and a body portion, a thermometer in said portion graduated in percentage corrections, said instrument having a scale that is calibrated so as to measure the specific gravity of a specific solution containing the fat content of a sample of known weight in terms of the percentage of fat in the sample.

In testimony whereof I have affixed my signature to this specification.

CLARENCE P. HARRIS.